US012698388B2

(12) United States Patent
Tanaka et al.

(10) Patent No.: US 12,698,388 B2
(45) Date of Patent: Aug. 4, 2026

(54) ORGANIC FINE PARTICLE

(71) Applicants: DAIKIN INDUSTRIES, LTD., Osaka (JP); NATIONAL UNIVERSITY CORPORATION KOBE UNIVERSITY, Kobe (JP)

(72) Inventors: Yoshito Tanaka, Osaka (JP); Mayumi Iida, Osaka (JP); Yuko Shiotani, Osaka (JP); Marina Aihara, Osaka (JP); Masahiro Higashi, Osaka (JP); Hideto Minami, Kobe (JP)

(73) Assignees: DAIKIN INDUSTRIES, LTD., Osaka (JP); NATIONAL UNIVERSITY CORPORATION KOBE UNIVERSITY, Hyogo (JP)

( * ) Notice: Subject to any disclaimer, the term of this patent is extended or adjusted under 35 U.S.C. 154(b) by 696 days.

(21) Appl. No.: 18/084,025

(22) Filed: Dec. 19, 2022

(65) Prior Publication Data

US 2023/0122463 A1 Apr. 20, 2023

Related U.S. Application Data

(63) Continuation of application No. PCT/JP2021/023992, filed on Jun. 24, 2021.

(30) Foreign Application Priority Data

Jul. 9, 2020 (JP) ................................ 2020-118765

(51) Int. Cl.
*C08L 51/06* (2006.01)
*C09D 151/06* (2006.01)

(52) U.S. Cl.
CPC ............ *C08L 51/06* (2013.01); *C09D 151/06* (2013.01)

(58) Field of Classification Search
CPC ...... C08L 51/00; C08L 51/003; C08L 51/006; C08L 51/004; C09D 151/00; C09D 151/003; C09D 151/006; C09D 151/004; C08F 255/00; C08F 257/00; C08F 259/00; C08F 265/00; C08F 265/04; C08F 265/06
See application file for complete search history.

(56) References Cited

U.S. PATENT DOCUMENTS

| | | | |
|---|---|---|---|
| 5,057,577 | A | 10/1991 | Matsuo et al. |
| 2003/0118722 | A1 | 6/2003 | Lee et al. |
| 2019/0077984 | A1 | 3/2019 | Kawabe et al. |

FOREIGN PATENT DOCUMENTS

| | | | |
|---|---|---|---|
| EP | 2 762 504 | A1 | 8/2014 |
| JP | 02-1795 | A | 1/1990 |
| JP | 05-117344 | A | 5/1993 |
| JP | 07-278442 | A | 10/1995 |
| JP | 11-172126 | A | 6/1999 |
| JP | 2000-160148 | A | 6/2000 |
| WO | 2010/073623 | A1 | 7/2010 |
| WO | 2013/046851 | A1 | 4/2013 |
| WO | 2017/159754 | A1 | 9/2017 |

OTHER PUBLICATIONS

Chen, Y. et al. Journal of Applied Polymer Science vol. 99 pp. 107-114 (Year: 2006).*
Extended European Search Report dated Jun. 19, 2024, issued in European Application No. 21837402.3.
International Preliminary Report on Patentability dated Jan. 10, 2023 with a Translation of the Written Opinion of the International Searching Authority in Application No. PCT/JP2021/023992.
International Search Report of PCT/JP2021/023992 dated Aug. 24, 2021 [PCT/ISA/210].

* cited by examiner

*Primary Examiner* — Jeffrey S Lenihan
(74) *Attorney, Agent, or Firm* — Sughrue Mion, PLLC

(57) ABSTRACT

An organic fine particle comprising a core polymer and a shell polymer. The core polymer has a Tg or a melting point of 15° C. or more, the core polymer has a water contact angle of 100° or more, all monofunctional monomers constituting the core polymer are a hydrophobic core monomer of which homopolymer has a water contact angle of 100° or more, the shell polymer has a Tg or a melting point lower than Tg or the melting point of the core polymer, the shell polymer has a water contact angle of less than 100°, and all monofunctional monomers constituting the shell polymer are a water-insoluble shell monomer of which homopolymer is water-insoluble. Also disclosed is a surface coating structure including the organic fine particle and a water-repellant composition including a dispersion of the organic fine particle.

13 Claims, 1 Drawing Sheet

ORGANIC FINE PARTICLE

This is a Rule 53(b) Continuation of International Application No. PCT/JP2021/023992 filed Jun. 24, 2021, claiming priority from Japanese Patent Application No. 2020-118765 filed Jul. 9, 2020, the respective disclosures of which are incorporated herein by reference in their entirety.

TECHNICAL FIELD

The present disclosure relates to an organic fine particle, and more specifically to an organic fine particle with a core-shell structure.

BACKGROUND ART

Coating of fluororesin and the like is known to provide water-repellency to the surface of a substrate. For example, it is known that coating of fluororesin allows the surface of a substrate to have water-repellency with a water contact angle of about 120° C. However, in recent years a non-fluorine water-repellent coating material having excellent water-repellency without using fluorine or with a reduced amount of fluorine has been needed to be developed from the viewpoint of environmental impact.

Patent Literature 1 discloses that water repellency can be given to a substrate by coating the substrate with a coating solution prepared by dispersing fine particles with a hydrophobic surface having an average primary particle size of 100 nm or less in an organic solvent including 65% by mass or more of a hydrophobic solvent based on all organic solvents. Inorganic particles are used as the fine particle in Patent Literature 1.

Patent Literature 2 discloses a core-shell emulsion in which the core is a hydrophobic polymer having a glass transition temperature (Tg) of 90° C. or more and the shell is a copolymer of an α,β-monoethylenically unsaturated carboxylic acid, a polymerizable monomer having a polyoxyalkylene chain and another polymerizable monomer, which has a Tg of 0 to 70° C. A monomer of which homopolymer is water soluble is used in Patent Literature 2.

PRIOR ART

Patent Literature

Patent Literature 1: WO 2010/073623
Patent Literature 2: JP H5-117344 A

SUMMARY

An embodiment of the present disclosure is as follows.

An organic fine particle comprising a core polymer and a shell polymer, wherein

- the core polymer has a Tg or a melting point of 15° C. or more,
- the core polymer has a water contact angle of 1000 or more,
- all monofunctional monomers constituting the core polymer are a hydrophobic core monomer of which homopolymer has a water contact angle of 1000 or more,
- the shell polymer has a Tg or a melting point lower than the Tg of the core polymer, or the shell polymer has a Tg or a melting point lower than the melting point of the core polymer,
- the shell polymer has a water contact angle of less than 100°, and
- all monofunctional monomers constituting the shell polymer are a water-insoluble shell monomer of which homopolymer is water-insoluble.

DESCRIPTION OF EMBODIMENTS

Figure 1A:
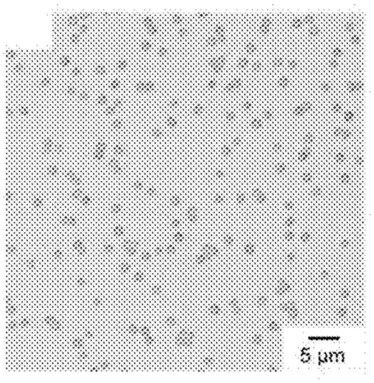
FIG. 1A is an optical micrograph of PSA particles and FIG. 1B is a scanning electron microscope (SEM) image of PSA particles in Examples.

The present disclosure provides a novel water-repellent composition which can give excellent water repellency to substrates by using an organic fine particle having a core-shell structure with a specific compositional feature. According to the present disclosure, use of a specific organic fine particle allows unevenness to be formed on the surface of a substrate and excellent water-repellency can be given to the substrate.

<Water-Repellent Composition>

The water-repellent composition comprises an organic fine particle and a liquid medium. The water-repellent composition may further comprise at least one selected from a liquid medium, a binder resin, a dispersant, a surfactant and other additives.

[Organic Fine Particle]

The organic fine particle is an active ingredient that provides water-repellency.

The organic fine particles may have an average particle size of 10 nm or more, 50 nm or more, 100 nm or more, 300 nm or more, or 750 nm or more, and preferably 50 nm or more. The organic fine particles may have an average particle size of 5,000 nm or less, 4,000 nm or less, 3,000 nm or less, or 2,000 nm or less, and preferably 4,000 nm or less. The average particle size means a number average particle size measured in an image analysis.

The organic fine particle according to the present disclosure comprises a core polymer and a shell polymer to have a core-shell structure. The core polymer and the shell polymer may be chemically and/or physically bonded.

(Core Polymer)

The core polymer forms the core of the core-shell structure. The core polymer may be formed of a non-fluorine polymer or a fluorine-containing polymer. The core polymer may be a random polymer.

The core polymer may have a Tg or a melting point of 15° C. or more, 17.5° C. or more, 20° C. or more, 22.5° C. or more, 25° C. or more, 27.5° C. or more, or 29.5° C. or more, and preferably 17.5° C. or more, or 22.5° C. or more. The core polymer may have a Tg or a melting point of 150° C. or less, 100° C. or less, 75° C. or less, 50° C. or less, 45° C. or less, or 40° C. or less, and preferably 100° C. or less. The melting point and Tg may be measured by a known method, for example differential scanning calorimetry (DSC).

The core polymer may have a water contact angle of 1000 or more, 1010 or more, 1030 or more, 1050 or more, 1100 or more, 1150 or more, or 1200 or more. The core polymer may have a water contact angle of 1600 or less, or 1400 or less. It is preferable that the core polymer has a water contact angle in the above range from the viewpoint of the water-repellency of the organic fine particle. The water contact angle of polymer means a water contact angle of polymer on spin coated film as shown in Examples.

Hydrophobic Core Monomer

The core polymer has a repeating unit derived from a monofunctional monomer. The "monofunctional monomer" refers to a monomer having an ethylenically unsaturated double bond. The monofunctional monomers constituting the core polymer may be a hydrophobic core monomer of which homopolymer has a water contact angle of 100° or more. All the monofunctional monomers constituting the core polymer may be a hydrophobic core monomer. The homopolymer of the hydrophobic core monomer may have a water contact angle of 100° or more, 101° or more, 103° or more, 105° or more, 110° or more, 115° or more, or 120° or more, and preferably 100° or more. The homopolymer of the hydrophobic core monomer may have a water contact angle of 160° or less, 140° or less, 130° or less, 125° or less, or 110° or less. It is preferable that the homopolymer has a water contact angle in the above range from the viewpoint of the water-repellency of the organic fine particle.

It is preferable that the hydrophobic core monomer does not include a reactive/hydrophilic monomer having an ethylenically unsaturated double bond and at least one a reactive group and/or a hydrophilic group. Examples of reactive groups include an epoxy group, a chloromethyl group, a bromomethyl group, an iodomethyl group and blocked isocyanate group. Examples of hydrophilic groups include a hydroxyl group, a polyalkylene oxide group, an amino group, a carboxylic acid group, a sulfonic acid group, a phosphoric acid group, an alkali metal or alkaline earth metal salt group of a carboxylic acid, a sulfonic acid, or a phosphoric acid, an ammonium salt group in which a chlorine, bromine or iodine ion is the counter anion, and other ionic groups.

Examples of reactive/hydrophilic monomers not included in the hydrophobic core monomer include glycidyl (meth) acrylate, glycerol (meth)acrylate, hydroxymethyl (meth) acrylate, hydroxyethyl (meth)acrylate, 3 -hydroxypropyl (meth)acrylate, 2-hydroxypropyl (meth)acrylate, 2,3-dihydroxypropyl (meth)acrylate, 3-chloro-2-hydroxypropyl (meth)acrylate, 3-hydroxybutyl (meth)acrylate, 4-hydroxybutyl (meth)acrylate, 2-hydroxybutyl (meth)acrylate, 2-acetoacetoxyethyl (meth)acrylate, 4-hydroxybutyl acrylate glycidyl ether, acrylic acid, methacrylic acid, trimethylsilyl (meth)acrylate, 2-(trimethylsilyloxy) ethyl (meth)acrylate, 2-(dimethylamino) ethyl (meth)acrylate, 2-(tert-butylamino) ethyl (meth)acrylate, dimethylaminoethyl methacrylate quaternary compound, and tetrahydrofurfuryl (meth)acrylate.

The hydrophobic core monomer may have at least one hydrocarbon group having 4 to 40 carbon atoms. The hydrocarbon group is preferably an aliphatic hydrocarbon group, particularly preferably a saturated aliphatic hydrocarbon group, and particularly preferably an alkyl group. The hydrocarbon group may be linear or branched. The hydrocarbon group may have 4 or more, 6 or more, 8 or more, 10 or more, 11 or more, 12 or more, 14 or more, or 16 or more carbon atoms, and preferably 6 or more carbon atoms. The hydrocarbon group has 40 or less, 30 or less, 25 or less, 22 or less or 20 or less carbon atoms, and preferably 30 or less carbon atoms.

The hydrophobic core monomer may have at least one fluoroalkyl group having 2 to 6 carbon atoms. When the fluoroalkyl group has 2 or more carbon atoms, polymer having the hydrophobic core monomer has a water contact angle of 1000 or more. The fluoroalkyl group may have 4 to 6 carbon atoms, for example 5 or 6, and particularly 6. It is preferable that the fluoroalkyl group is a perfluoroalkyl group. Examples of fluoroalkyl group include $—CF_2CF_3$, $—CF_2CF_2CF_3$, $—CF(CF_3)_2$, $—CF_2CF_2CF_2CF_3$, $—CF_2CF(CF_3)_2$, $—C(CF_3)_3$, $—(CF_2)_4CF_3$, $—(CF_2)_2CF(CF_3)_2$, $—CF_2C(CF_3)_3$, $—CF(CF_3)\ CF_2CF_2CF_3$, $—(CF_2)_5CF_3$, $—(CF_2)_3CF(CF_3)_2$, $—C(CF_3)_2CH_3$, $—C(CF_3)_2H$, $—CF_2CF_2H$, $—CF_2CF_2CF_2CF_2H$ and $—CF_2CF_2CF_2CF_2CF_2CF_2H$.

The hydrophobic core monomer may be a monomer represented by the formula:

$$CH_2{=}C(—R^{12})—C({=}O)—Y^{11}—(R^{11})\text{ or}$$

$$CH_2{=}C(—R^{22})—Y^{21}—(H)_{5-l}—(R^{21})_l$$

wherein $R^{11}$ is an aliphatic hydrocarbon group having 11 to 40 carbon atoms or $—(CH_2)_jR^{13}$, where $R^{13}$ is a fluoroalkyl group having 2 to 6 carbon atoms and j is 1 to 6, for example, 1 to 4, or 2 or 3, $R^{21}$ is a hydrocarbon group having 3 to 30 carbon atoms, $R^{12}$ and $R^{22}$ are each independently a hydrogen atom, a monovalent organic group or a halogen atom, $Y^{11}$ is a divalent to tetravalent group composed of at least one selected from a direct bond, a divalent to tetravalent hydrocarbon group having 1 carbon atom, $—C_6H_4—$, $—O—$, $—C({=}O)—$, $—S({=}O)_2—$ and $—NR'—$, where R' is H or a hydrocarbon group having 1 to 4 carbon atoms, $Y^{21}$ is a group formed by removing l+1 hydrogen atoms from a benzene ring, H is a hydrogen atom, H and $R^{21}$ are each directly bonded to $Y^{21}$, and k and l are each independently 1 to 3.

$R^{11}$ and $R^{21}$ are preferably a branched or long-chain (or long-chain linear) hydrocarbon group. The hydrocarbon group is preferably an aliphatic hydrocarbon group, particularly a saturated aliphatic hydrocarbon group, particularly an alkyl group. The $—CH_3$ group has a lower surface free energy than the $—CH_2—$ group and tends to exhibit water-repellency. Therefore, a structure having many branches and many $—CH_3$ groups is preferred. On the other hand, a long-chain alkyl group having a certain length exhibits high water-repellency due to its crystallinity. Therefore, $R^{11}$ and $R^{21}$ may be a branched hydrocarbon group (for example, a branched alkyl group), particularly a t-butyl group or an isopropyl group, a group having a multi-branched structure, or a long-chain hydrocarbon group (or long-chain linear hydrocarbon group), for example, an alkyl group. $R^{11}$ may have 11 or more, 12 or more, 14 or more, 16 or more or 18 or more carbon atoms and preferably 12 or more carbon atoms. $R^{11}$ may have 25 or less, 20 or less, 15 or less or 10 or less carbon atoms. $R^{21}$ may have 4 or more, 6 or more, 8 or more, 10 or more or 12 or more carbon atoms. $R^{21}$ may have 25 or less, 15 or less or 10 or less carbon atoms.

$R^{13}$ may be a fluoroalkyl group having 2 to 6 carbon atoms. The fluoroalkyl group may have 4 to 6 carbon atoms, for example 5 or 6, and particularly 6. It is preferable that the fluoroalkyl group is a perfluoroalkyl group. Examples of fluoroalkyl group include $—CF_2CF_3$, $—CF_2CF_2CF_3$, $—CF(CF_3)_2$, $—CF_2CF_2CF_2CF_3$, $—CF_2CF(CF_3)_2$, $—C(CF_3)_3$, $—(CF_2)_4CF_3$, $—(CF_2)_2CF(CF_3)_2$, $—CF_2C(CF_3)_3$, $—CF(CF_3)\ CF_2CF_2CF_3$, $—(CF_2)_5CF_3$, $—(CF_2)_3CF(CF_3)_2$, $—C(CF_3)_2CH_3$, $—C(CF_3)_2H$, $—CF_2CF_2H$, $—CF_2CF_2CF_2CF_2H$ and $—CF_2CF_2CF_2CF_2CF_2CF_2H$.

k is 1, 2 or 3. When $Y^{11}$ has a tetravalent hydrocarbon group having 1 carbon atom, k is 3. When $Y^{11}$ has a trivalent hydrocarbon group having 1 carbon atom, k is 2. When $Y^{11}$ does not have a trivalent and tetravalent hydrocarbon group having 1 carbon atom (for example, when $Y^{11}$ has a divalent hydrocarbon group having 1 carbon atom (—$CH_2$—) (for example, 1 to 6)), k is 1.

$R^{12}$ and $R^{22}$ may be a hydrogen atom, a methyl group, a halogen atom, a substituted or unsubstituted benzyl group, a substituted or unsubstituted phenyl group, or a —$CF_3$ group. Examples of $R^{12}$ and $R^{22}$ include a hydrogen atom, a methyl group, a chlorine atom, a bromine atom, an iodine atom, a fluorine atom, —$CF_3$ group, and a cyano group. $R^{12}$ and $R^{22}$ are preferably a hydrogen atom, a methyl group, or a chlorine atom. $R^{12}$ is more preferably a methyl group. Since $R^{12}$ is a methyl group, higher water-repellency can be obtained. $R^{22}$ is preferably a hydrogen atom, particularly from the viewpoint of reactivity.

$Y^{11}$ is preferably a divalent group. Examples of the divalent to tetravalent hydrocarbon group having 1 carbon atom include —$CH_2$—, —CH= having a branched structure, and —C= having a branched structure.

$Y^{11}$ may be —Y'—, —Y'—Y'—, —Y'—C(=O)—, —C(=O)—Y'—, —Y'—C(=O)—Y'—, —Y'—X'—, —Y'—X'—Y'—, —Y'—X'—Y'—C(=O)—, —Y'—X'—C(=O)—Y'—, —Y'—X'—Y'—C(=O)—Y'—, or —Y'—X'—Y'—X'—, wherein Y' is each independently a direct bond, —O—, —NR'—, wherein R' is H or a hydrocarbon group having 1 to 4 carbon atoms, or —$S(=O)_2$—;

X' is —$(CH_2)_m$—, wherein m is an integer of 1 to 5, a linear hydrocarbon group having 1 to 5 carbon atoms and an unsaturated bond, a hydrocarbon group having 1 to 5 carbon atoms and a branched structure, or —$(CH_2)_l$—$C_6H_4$—$(CH_2)_l$—, wherein l is each independently an integer of 0 to 5, and —$C_6H_4$— is a phenylene group. It is preferable that $Y^{11}$ is not only a divalent hydrocarbon group. When $R^{11}$ is —$(CH_2)_jR^{13}$, Y11 may be a direct bond.

Specific examples of $Y^{11}$ include —O—, —NH—, —O—C(=O)—, —NH—C(=O)—, —O—C(=O)—NH—, —NH—C(=O)—O—, —NH—C(=O)—NH—, —O—$C_6H_4$—, —NH—$C_6H_4$—, —O—$(CH_2)_m$O—, —NH—$(CH_2)_m$—NH—, —O—$(CH_2)_m$—NH—, —NH—$(CH_2)_m$—O—, —O—$(CH_2)_m$—O—C(=O)—, —O—$(CH_2)_m$—C(=O)—O—, —NH—$(CH_2)_m$—O—C(=O)—, —NH—$(CH_2)_m$—C(=O)—O—, —O—$(CH_2)_m$—O—C(=O)—NH—, —O—$(CH_2)_m$—NH—C(=O)—O—, —O—$(CH_2)_m$—C(=O)—NH—, —O—$(CH_2)_m$—NH—C(=O)—, —O—$(CH_2)_m$—NH—C(=O)—NH—, —O—$(CH_2)_m$—O—$C_6H_4$—, —O—$(CH_2)_m$—NH—$S(=O)_2$—, —O—$(CH_2)_m$—$S(=O)_2$—NH—, —NH—$(CH_2)_m$—NH—$S(=O)_2$—, —NH—$(CH_2)_m$—$S(=O)_2$—NH—, —NH—$(CH_2)_m$—O—C(=O)—NH—, —NH—$(CH_2)_m$—NH—C(=O)—O—, —NH—$(CH_2)_m$—C(=O)—NH—, —NH—$(CH_2)_m$—NH—C(=O)—, —NH—$(CH_2)_m$—NH—C(=O)—NH—, —NH—$(CH_2)_m$—O—$C_6H_4$—, or —NH—$(CH_2)_m$—NH—$C_6H_4$—, wherein m is an integer of 1 to 5, in particular 2 or 4.

$Y^{11}$ is preferably —O—, —NH—, —O—$(CH_2)_m$—O—C(=O)—, —O—$(CH_2)_m$—NH—C(=O)—, —O—$(CH_2)_m$—O—C(=O)—NH—, —O—$(CH_2)_m$—NH—C(=O)—O—, —O—$(CH_2)_m$—NH—C(=O)—NH—, —O—$(CH_2)_m$ —NH—$S(=O)_2$— or —O—$(CH_2)_m$—$S(=O)_2$—NH—, —NH—$(CH_2)_m$—O—C(=O)—, —NH—$(CH_2)_m$—NH—C(=O)—, —NH—$(CH_2)_m$—O—C(=O)—NH—, —NH—$(CH_2)_m$—NH—C(=O)—O—, —NH—$(CH_2)_m$—NH—C(=O)—NH—, wherein m is an integer of 1 to 5, in particular 2 or 4. $Y^{11}$ is more preferably —O—, —O—$(CH_2)_m$—O—C(=O)—NH—, —O—$(CH_2)_m$—NH—C(=O)—O—, or —O—$(CH_2)_m$—NH—C(=O)—, —O—$(CH_2)_m$—NH—$S(=O)_2$—, or —O—$(CH_2)_m$—$S(=O)_2$—NH—, in particular —O—$(CH_2)_m$—NH—C(=O)—.

$Y^{21}$ is a group formed by removing l+1 hydrogen atoms from a benzene ring. The monomer having $Y^{21}$ has a styryl group. 1 to 3 $R^{21}$ groups may be present in the monomer having $Y^{21}$.

Specific examples of the hydrophobic core monomer are as follows. Although compounds of the following chemical formulas are acryl compounds having a hydrogen atom at the α-position, specific examples may include methacrylic compounds having a methyl group at the α-position and α-chloracrylic compounds having a chlorine atom at the α-position. Also in the styrene derivative, although compounds of the following chemical formulas are a hydrogen atom at the α-position, specific examples may include α-methylstyrene compounds having a methyl group at the α-position and α-chlorostyrene compounds having a chlorine atom at the α-position, and preferred are styrene compounds having a hydrogen atom at the α-position.

$CH_2=CHC(=O)OC_{18}H_{37}$ $CH_2=CHC(=O)OC_2H_4OC(=O)NHC_{18}H_{37}$ $CH_2=CHC(=O)OC_2H_4NHC(=O)OC_{18}H_{37}$ $CH_2=CHC(=O)OC_2H_4NHC(=O)OC_{18}H_{37}$ $CH_2=CHC(=O)OC_mH_{2m}NHC(=O)C_nH_{2n+1}$ $CH_2=CHC(=O)OC_2H_4OC(=O)NHC_nH_{2n+1}$ $CH_2=CHC(=O)OC_2H_4NHC(=O)OC_nH_{2n+1}$ $CH_2=CHC(=O)OC_2H_4NHC(=O)NHC_nH_{2n+1}$ $CH_2=CHC(=O)OC_4H_8OC(=O)NHC_nH_{2n+1}$ $CH_2=CHC(=O)NHC_mH_{2m}OC(=O)NHC_nH_{2n+1}$

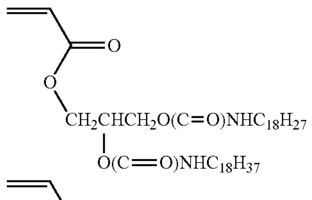

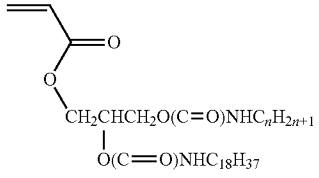

$CH_2=CHC(=O)OC_mH_{2m}NHSO_2C_nH_{2n+1}$ $CH_2=CHC(=O)OC_mH_{2m}SO_2NHC_nH_{2n+1}$ $CH_2=CHC(=O)OC_mH_{2m}C_2F_5$ $CH_2{=}CHC({=}O)OCH_2C_2F_5$ $CH_2{=}CHC({=}O)OCH_2CH_2C_4F_9$ $CH_2{=}CHC({=}O)OCH_2CH_2C_6F_{13}$ wherein n is a number of 11 to 40 and m is a number of 1 to 5.

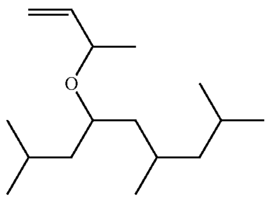

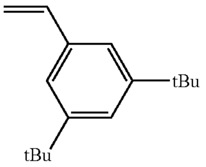

Preferred examples of hydrophobic core monomers include stearyl (meth)acrylate, stearic acid amidoethyl (meth)acrylate, $CH_2{=}CHC({=}O)OC_2H_4NHSO_2C_{18}H_{37}$, t-butylstyrene and 2,4-di-t-butylstyrene.

Crosslinkable Core Monomer

The core polymer may have a repeating unit derived from a crosslinkable core monomer having at least two ethylenically unsaturated double bonds. In other words, the core polymer may be cross-linked.

The crosslinkable core monomer has at least two (particularly two, three or four) ethylenically unsaturated double bonds. The crosslinkable monomer (3) may be a fluorine-free monomer.

It is preferable that the crosslinkable monomer is a monomer represented by the formula:

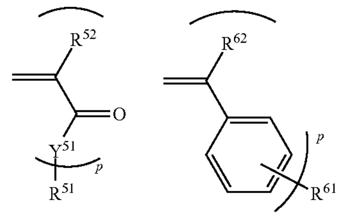

or

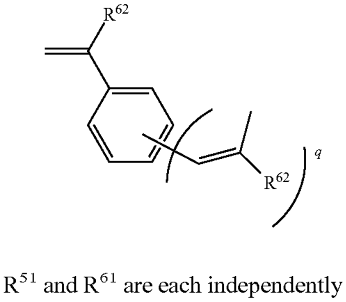

wherein $R^{51}$ and $R^{61}$ are each independently a direct bond or a divalent to hexavalent group composed of at least one selected from a hydrocarbon group having 1 to 20 carbon atoms, $—(CH_2CH_2O)_r—$, where r is an integer of 1 to 10, $—C_6H_4—$, —O— and —NR'—, where R' is H or a hydrocarbon group having 1 to 4 carbon atoms, $R^{52}$ and $R^{62}$ are a hydrogen atom, a monovalent organic group, or a halogen atom, $Y^{51}$ is —O— or —NR'—, where R' is H or a hydrocarbon group having 1 to 4 carbon atoms, p is 2 to 6 and q is 1 to 5.

Examples $R^{51}$ and $R^{61}$ include a group including a direct bond, a divalent to hexavalent group (for example, divalent to tetravalent or di- or trivalent) hydrocarbon group, an ethylene glycol group, a propylene glycol group, a glycerol group, a cyclohexyl group, dicyclopentanyl group, an adamanthyl group, an isobornyl group, a naphthalene group, a bornyl group, a tricyclodecanyl group or a phenyl group.

$R^{52}$ and $R^{62}$ may each independently be a hydrogen atom, a methyl group, a halogen atom, a substituted or unsubstituted benzyl group, a substituted or unsubstituted phenyl group, or a $—CF_3$ group. Examples of $R^{52}$ and $R^{62}$ include a hydrogen atom, a methyl group, a chlorine atom, a bromine atom, an iodine atom, a fluorine atom, $—CF_3$ group, and a cyano group. $R^{52}$ and $R^{62}$ are preferably a hydrogen atom, a methyl group, or a chlorine atom. $R^{52}$ is more preferably a methyl group. Since $R^{52}$ is a methyl group, higher water-repellency can be obtained. $R^{62}$ is preferably a hydrogen atom particularly from the viewpoint of reactivity, but is preferably a methyl group from the viewpoint of water repellency, and $R^{62}$ is preferably selected so as to satisfy both the reactivity and water-repellency.

Examples of cross-linkable core monomers include divinylbenzene, 1,4-butanediol di(meth)acrylate, 1,6-hexanediol di(meth)acrylate, 1,9-nonanediol di(meth)acrylate, neopentyl glycol di(meth)acrylate, polyethylene glycol di(meth) acrylate, triethylene glycol di(meth)acrylate, ethylene glycol di(meth)acrylate, methylene glycol di(meth)acrylate, polytetramethylene glycol di(meth)acrylate, dimethyloltricyclodecane di(meth)acrylate, trimethylolpropane tri(meth)acrylate, adamantyl di(meth)acrylate, glycerin di(meth)acrylate, tricyclodecane dimethanol di(meth)acrylate, dicyclopentanyl di(meth)acrylate, 5-hydroxy-1,3-adamantane di(meth) acrylate, pentaerythritol triacrylate, pentaerythritol tetraacrylate and dipentaerythritol hexaacrylate (Shell Polymer)

The shell polymer forms the shell of the core-shell structure. The shell polymer may be formed of a non-fluorine polymer or a fluorine-containing polymer. The shell polymer may be a random polymer.

The shell polymer may have a Tg or a melting point lower than the Tg or the melting point of the core polymer. For example, the shell polymer has a Tg lower than the Tg of the core polymer or a melting point lower than the melting point of the core polymer. The higher of the Tg and the melting point of the shell polymer may be lower than the higher of the Tg and the melting point of the core polymer.

When the core polymer has a repeating unit derived from a crosslinkable core monomer having at least two ethylenically unsaturated double bonds, the shell polymer may have a Tg or a melting point less than the 10% thermal decomposition temperature, less than the 5% thermal decomposition temperature or less than the 1% thermal decomposition temperature of the core polymer. When the 10% thermal decomposition temperature of the core polymer is defined as $T^{10}$, the shell polymer has a Tg or a melting point of less than $T^{10}$, preferably $T^{10}$−10° C. or less, more preferably $T^{10}$−20° C. or less, and further preferably $T^{10}$−50° C. or less. A larger difference between them allows a broader range of processing (applications) of the organic fine particle. The 10% thermal decomposition temperature means a value obtained by TGA (thermogravimetric analysis) in air under conditions of a temperature increase rate of 10° C./minute.

The difference between the Tg of the shell polymer and the Tg of the core polymer may be 5° C. or more, 10° C. or more, 15° C. or more, 20° C. or more, 25° C. or more, 30° C. or more, 35° C. or more, or 40° C. or more, and preferably 20° C. or more. The difference between the Tg of the shell polymer and the Tg of the core polymer may be 100° C. or less, 90° C. or less, 80° C. or less, 70° C. or less, 60° C. or less or 50° C. or less, and preferably 90° C. or less.

The shell polymer may have a Tg or a melting point of −120° C. or more, −100° C. or more, −80° C. or more, −60° C. or more, −50° C. or more, −45° C. or more, or −40° C. or more, and preferably −100° C. or more. The shell polymer may have a Tg or a melting point of less than 15° C., 12° C. or less, 10° C. or less, 7.5° C. or less, 5° C. or less, 2.5° C. or less, 0° C. or less, −2.5° C. or less, −5° C. or less, or −7.5° C. or less, and preferably −10° C. or less. It is preferable that the Tg or the melting point of the shell polymer is in the above range in consideration of film formability and the like.

The shell polymer may have a water contact angle of less than 100°, 99° or less, 98° or less, or 95° or less. It is preferable that the shell polymer has a water contact angle in the above range from the viewpoint of water-repellency and dispersibility in dispersion (in particular, dispersibility in water) of the organic fine particle.

It is preferable that the shell polymer has a water contact angle lower than the water contact angle of the core polymer. The difference between the water contact angle of the shell polymer and the water contact angle of the core polymer may be 1° or more, 2° or more, 3° or more or 4° or more, and preferably 2° or more.

Water-Insoluble Shell Monomer

The shell polymer has a repeating unit derived from a monofunctional monomer. All monofunctional monomers constituting the shell polymer may be a water-insoluble shell monomer. The monofunctional monomers constituting the shell polymer may be a water-insoluble shell monomer of which homopolymer has a water contact angle of less than 100°. The homopolymer of the water-insoluble shell monomer may have a water contact angle of 10° or more, 30° or more, 50° or more, 70° or more, 80° or more or 90°. The homopolymer of the water-insoluble shell monomer may have a water contact angle of less than 100°, 99° or less, 98° or less, 90° or less, 80° or less, 70° or less, 60° or less, 50° or less or 40° or less, and preferably 99° or 90° or less. It is preferable that the homopolymer of the water-insoluble shell polymer has a water contact angle in the above range from the viewpoint of water-repellency and dispersibility in dispersion (in particular, dispersibility in water) of the organic fine particle.

The water-insoluble shell monomer may have a solubility in water at 25° C. of 10 g/l or less, 5 g/l or less, 3 g/l or less, 1 g/l or less, 0.5 g/l or less, or 0.1 g/l or less, and preferably 3 g/l or less.

The homopolymer of the water-insoluble shell monomer may have a solubility in water at 25° C. of 10 g/l or less, 5 g/l or less, 3 g/l or less, 1 g/l or less, 0.5 g/l or less or 0.1 g/l or less, and preferably 3 g/l or less.

It is not preferable to use a water-soluble shell monomer (e.g., an unsaturated carboxylic acid monomer such as acrylic acid and methacrylic acid; a polyethylene glycol chain-containing monomer such as poly(ethylene glycol) methacrylate; an amphipathic monomer such as 2-methacryloyloxyethylphosphoryl choline and carboxymethyl betaine monomer; and quaternary ammonium salt-containing acrylate), because the shell polymer becomes more hydrophilic and as a result reduces water-repellency of the organic fine particle significantly.

The water-insoluble shell monomer may have at least one hydrocarbon group having 3 to 10 carbon atoms. The hydrocarbon group is preferably an aliphatic hydrocarbon group, particularly preferably a saturated aliphatic hydrocarbon group, and particularly preferably an alkyl group. The hydrocarbon group may be linear or branched. The hydrocarbon group may have 3 or more, 4 or more, 5 or more, 6 or more, or 7 or more carbon atoms. The hydrocarbon group may have 10 or less, or 9 or less carbon atoms.

The hydrophobic core monomer may have at least one fluoroalkyl group having 1 carbon atom. It is preferable that the fluoroalkyl group is a perfluoroalkyl group. Examples of fluoroalkyl groups include $—CF_3$, $—CF_2H$ and $—CFH_2$.

It is preferable that the water-insoluble shell monomer includes an aliphatic compound. The water-insoluble shell monomer may be composed only of an aliphatic compound. For example, when the core polymer is not crosslinked, the water-insoluble shell monomer may be composed only of an aliphatic compound.

The water-insoluble shell monomer may be a monomer represented by the formula:

$$CH_2{=}C({-}R^{32}){-}C({=}O){-}Y^{31}{-}(R^{31})_m \text{ or}$$

$$CH_2{=}C({-}R^{42}){-}Y^{41}{-}(H)_{5-n}{-}(R^{41})_n$$

wherein $R^{31}$ is an aliphatic hydrocarbon group having 1 to 10 carbon atoms or $—(CH_2)_iR^{33}$, where $R^{33}$ is a fluoroalkyl group having 1 carbon atom and i is 1 to 6, for example, 1 to 4 or 2 to 3, $R^{41}$ is a hydrocarbon group having 1 to 2 carbon atoms, $R^{32}$ and $R^{42}$ are each independently a hydrogen atom, a monovalent organic group or a halogen atom, $Y^{31}$ is a divalent to tetravalent group composed of at least one selected from a direct bond, a divalent to tetravalent hydrocarbon group having 1 carbon atom, $—C_6H_4—$, $—O—$, $—C(=O)—$, $—S(=O)_2—$ and $—NR'—$, where R' is H or a hydrocarbon group having 1 to 4 carbon atoms, $Y^{41}$ is a group formed by removing n+1 hydrogen atoms from a benzene ring, H is a hydrogen atom, H and $R^{41}$ are each directly bonded to $Y^{41}$, and m is 1 to 3 and n is 0 to 3.

It is preferable that $R^{31}$ and $R^{41}$ are a branched or long-chain (or linear long-chain) hydrocarbon group. The hydrocarbon group is preferably an aliphatic hydrocarbon group, particularly preferably a saturated aliphatic hydrocarbon group, and particularly preferably an alkyl group. $R^{31}$ may have 1 or more, 3 or more, 4 or more, 5 or more, 6 or more, or 7 or more carbon atoms, and 10 or less, or 9 or less carbon atoms.

$R^{33}$ may be a fluoroalkyl group having 1 carbon atom. It is preferable that the fluoroalkyl group is a perfluoroalkyl group. Examples of fluoroalkyl groups include $—CF_3$, $—CF_2H$ and $—CFH_2$.

m is 1, 2 or 3. When $Y^{31}$ has a tetravalent hydrocarbon group having 1 carbon atom, m is 3. When $Y^{31}$ has a trivalent hydrocarbon group having 1 carbon atom, m is 2. When $Y^{31}$ does not have a trivalent or tetravalent hydrocarbon group having 1 carbon atom (for example, when $Y^{31}$ has a divalent hydrocarbon group having 1 carbon atom ($—CH_2—$) (e.g., 1 to 6 groups)), m is 1.

$R^{32}$ and $R^{42}$ may be a hydrogen atom, a methyl group, a halogen atom, a substituted or unsubstituted benzyl group, a substituted or unsubstituted phenyl group, or a $—CF_3$ group. Examples of $R^{32}$ and $R^{42}$ include a hydrogen atom, a methyl group, a chlorine atom, a bromine atom, an iodine atom, a fluorine atom, $—CF_3$ group, and a cyano group. $R^{32}$ and $R^{42}$ are preferably a hydrogen atom, a methyl group, or a chlorine atom. $R^{12}$ is more preferably a methyl group.

$Y^{11}$ is preferably a divalent group. Examples of the divalent to tetravalent hydrocarbon group having 1 carbon atom include —$CH_2$—, —CH═ having a branched structure, and —C═ having a branched structure.

$Y^{31}$ may be —Y'—, —Y'—Y'—, —Y'—C(═O)—, —C(═O)—Y'—, —Y'—C(═O)—Y'—, —Y'—X'—, —Y'—X'—Y'—, —Y'—X'—Y'—C(═O)—, —Y'—X'—C(═O)—Y'—, —Y'—X'—Y'—C(═O)—Y'—, or —Y'—X'—Y'—X'— wherein Y' is each independently a direct bond, —O—, —NR'—, wherein R' is H or a hydrocarbon group having 1 to 4 carbon atoms, or —$S(═O)_2$—; X' is —$(CH_2)_m$—, wherein m is an integer of 1 to 5), a linear hydrocarbon group having 1 to 5 carbon atoms and an unsaturated bond, a hydrocarbon group having 1 to 5 carbon atoms and a branched structure, or —$(CH_2)_l$—$C_6H_4$—$(CH_2)_l$—, wherein l is each independently an integer of 0 to 5 and —$C_6H_4$— is a phenylene group). It is preferable that $Y^{31}$ is not only a divalent hydrocarbon group. When $R^{31}$ is —$(CH_2)_lR^{33}$, $Y^{31}$ may be a direct bond.

Specific examples of $Y^{31}$ include —O—, —NH—, —O—C(═O)—, —NH—C(═O)—, —O—C(═O)—NH—, —NH—C(═O)—O—, —NH—C(═O)—NH—, —O—$C_6H_4$—, —NH—$C_6H_4$—, —O—$(CH_2)_m$—O—, —NH—$(CH_2)_m$—NH—, —O—$(CH_2)_m$—NH—, —NH—$(CH_2)_m$—O—, —O—$(CH_2)_m$—O—C(═O)—, —O—$(CH_2)_m$—C(═O)—O—, —NH—$(CH_2)_m$—O—C(═O)—, —NH—$(CH_2)_m$—C(═O)—O—, —O—$(CH_2)_m$—O—C(═O)—NH—, —O—$(CH_2)_m$—NH—C(═O)—O—, —O—$(CH_2)_m$—C(═O)—NH—, —O—$(CH_2)_m$—NH—C(═O)—, —O—$(CH_2)_m$—NH—C(═O)—NH—, —O—$(CH_2)_m$—O—$C_6H_4$—, —O—$(CH_2)_m$—NH—$S(═O)_2$—, —O—$(CH_2)_m$—$S(═O)_2$—NH—, —NH—$(CH_2)_m$—NH—$S(═O)_2$—, —NH—$(CH_2)_m$—$S(═O)_2$—NH—, —NH—$(CH_2)_m$—O—C(═O)—NH—, —NH—$(CH_2)_m$—NH—C(═O)—O—, —NH—$(CH_2)_m$—C(═O)—NH—, —NH—$(CH_2)_m$—NH—C(═O)—, —NH—$(CH_2)_m$—NH—C(═O)—NH—, —NH—$(CH_2)_m$—O—$C_6H_4$— or —NH—$(CH_2)_m$—NH—$C_6H_4$— in which m is an integer of 1 to 5, in particular 2 or 4.

$Y^{31}$ is preferably —O—, —NH—, —O—$(CH_2)_m$—O—C(═O)—, —O—$(CH_2)_m$—NH—C(═O)—, —O—$(CH_2)_m$—O—C(═O)—NH—, —O—$(CH_2)_m$—NH—C(═O)—O—, —O—$(CH_2)_m$—NH—C(═O)—NH—, —O—$(CH_2)_m$ —NH—$S(═O)_2$— or —O—$(CH_2)_m$—$S(═O)_2$—NH—, —NH—$(CH_2)_m$—O—C(═O)—, —NH—$(CH_2)_m$—NH—C(═O)—, —NH—$(CH_2)_m$—O—C(═O)—NH—, —NH—$(CH_2)_m$—NH—C(═O)—O—, —NH—$(CH_2)_m$—NH—C(═O)—NH— in which m is an integer of 1 to 5, in particular 2 or 4. $Y^{31}$ is more preferably —O—, —O—$(CH_2)_m$—O—C(═O)—NH—, —O—$(CH_2)_m$—NH—C(═O)—O—, or —O—$(CH_2)_m$—NH—C(═O)—, —O—$(CH_2)_m$—NH—$S(═O)_2$—, or —O—$(CH_2)_m$—$S(═O)_2$—NH—, and particularly preferably —O—$(CH_2)_m$ —NH—C(═O)—.

$Y^{41}$ is a group formed by removing n+1 hydrogen atoms from a benzene ring. The monomer having $Y^{41}$ has a styryl group. 0 to 3 $R^{41}$ groups may be present in the monomer having $Y^{41}$.

Specific examples of water-insoluble shell monomers are as follows. The compounds of the following chemical formulas are an acrylic compound having a hydrogen atom at the α-position, and may be a methacrylic compound having a methyl group at the α-position and an α-chloroacrylic compound having a chlorine atom at the α-position. Likewise, for styrene derivatives, the compounds of the following chemical formulas have a hydrogen atom at the α-position, and specific examples may be α-methylstyrene compounds having a methyl group at the α-position and α-chlorostyrene compounds having a chlorine atom at the α-position. Styrene compounds having a hydrogen atom at the α-position are preferred.

$CH_2$═CHC(═O)$OC_mH_{2m}$NHC(═O)$C_nH_{2n+1}$ $CH_2$═CHC(═O)$OC_2H_4$OC(═O)$NHC_nH_{2n+1}$ $CH_2$═CHC(═O)$OC_2H_4$NHC(═O)$OC_nH_{2n+1}$ $CH_2$═CHC(═O)$OC_2H_4$NHC(═O)$NHC_nH_{2n+1}$ $CH_2$═CHC(═O)$OC_4H_8$OC(═O)$NHC_nH_{2n+1}$ $CH_2$═CHC(═O)$NHC_mH_{2m}$OC(═O)$NHC_nH_{2n+1}$ $CH_2$═CHC(═O)$OC_mH_{2m}NHSO_2C_nH_{2n+1}$ $CH_2$═CHC(═O)$OC_mH_{2m}SO_2NHC_nH_{2n+1}$ $CH_2$═CHC(═O)$OC_mH_{2m}CF_3$ $CH_2$═CHC(═O)$OCH_2CF_3$ wherein n is a number of 3 to 10 and m is a number of 1 to 5.

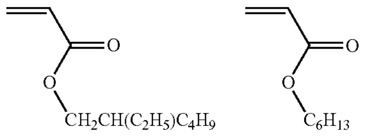

Preferred specific examples of water-insoluble monomers include 2-ethylhexyl (meth)acrylate, hexyl (meth)acrylate, octyl (meth)acrylate, 2-ethylhexyl (meth)acrylate, and hexyl (meth)acrylate.

Crosslinkable Shell Monomer

The shell polymer may have a repeating unit derived from a crosslinkable shell monomer having at least two ethylenically unsaturated double bonds, although it is preferable that the shell polymer does not have a repeating unit derived from a crosslinkable shell monomer having at least two ethylenically unsaturated double bonds. In other words, the shell polymer may not be cross-linked.

The crosslinkable shell monomer may be the same as those described in the section of the crosslinkable core monomer above.

For each of the hydrophobic core monomer, the crosslinkable core monomer, the water-insoluble shell monomer and the crosslinkable shell monomer, one may be used alone or a mixture of two or more of them may be used.

As used herein, "(meth)acrylate" means acrylate or methacrylate, and "(meth)acrylamide" means acrylamide or methacrylamide.

(Compositional Feature of Organic Particle)

In the organic fine particle, the weight ratio of the core polymer may be 5 wt % or more, 15 wt % or more, 30 wt % or more, 50 wt % or more, 75 wt % or more or 90 wt % or more, and more preferably 30 wt % or more. In the organic fine particle, the weight ratio of the core polymer may be 95 wt % or less, 75 wt % or less, 60 wt % or less, 50 wt % or less, 30 wt % or less or 25 wt % or less. In the organic fine particle, the weight ratio of the shell polymer may be 5 wt % or more, 15 wt % or more, 30 wt % or more, 50 wt % or more, 75 wt % or more or 90 wt % or more, and preferably 30 wt % or more. In the organic fine particle, the weight ratio of the shell polymer may be 95 wt % or less, 75 wt % or less, 60 wt % or less, 50 wt % or less, 30 wt % or less, or 25 wt % or less.

In the core polymer, the repeating unit derived from the hydrophobic core monomer may be 70 parts by mole or more, 75 parts by mole or more, 80 parts by mole or more, 85 parts by mole or more, 90 parts by mole or more, or 95 parts by mole or more based on 100 parts by mole in total of the repeating units. In the core polymer, the repeating unit derived from the hydrophobic core monomer may be 100 parts by mole or less, 99 parts by mole or less, 97.5 parts by mole or less, 95 parts by mole or less, or 92.5 parts by mole or less based on 100 parts by mole in total of the repeating units.

In the core polymer, the repeating unit derived from the crosslinkable core monomer may be 0.1 part by mole or more, 0.3 part by mole or more, 0.5 part by mole or more, 0.75 part by mole or more, 1.5 parts by mole or more, or 3.0 parts by mole or more based on 100 parts by mole in total of the repeating units. In the core polymer, the repeating unit derived from the crosslinkable core monomer may be 30 parts by mole or less, 20 parts by mole or less, 10 parts by mole or less, 5 parts by mole or less, 3 parts by mole or less, 1.5 parts by mole or less, 1.0 parts by mole or less, or 0.5 part by mole or less based on 100 parts by mole in total of the repeating units.

In the shell polymer, the repeating unit derived from the water-insoluble shell monomer may be 70 parts by mole or more, 75 parts by mole or more, 80 parts by mole or more, 85 parts by mole or more, 90 parts by mole or more, or 95 parts by mole or more based on 100 parts by mole in total of the repeating units. In the shell polymer, the repeating unit derived from the water-insoluble shell monomer may be 100 parts by mole or less, 99 parts by mole or less, 97.5 parts by mole or less, 95 parts by mole or less, or 92.5 parts by mole or less based on 100 parts by mole in total of the repeating units.

In the shell polymer, the repeating unit derived from the crosslinkable shell monomer may be 0.5 part by mole or less, or 0.1 part by mole or less, and preferably 0 parts by mole (not cross-linked) based on 100 parts by mole in total of the repeating units.

The amount of the organic fine particle may be 0.1% by weight or more, 1% by weight or more, 3% by weight or more, 5% by weight or more, or 10% by weight or more based on the composition. The amount of the liquid medium may be 75% by weight or less, 50% by weight or less, 30% by weight or less, 15% by weight or less, or 10% by weight or less based on the composition.

[Liquid Medium]

The water-repellent composition comprises a liquid medium, preferably an aqueous medium. The liquid medium is water alone, an organic solvent alone or a mixture of water and an organic solvent, and preferably water alone or a mixture of water and an organic solvent.

When the liquid medium is a mixture of water and an organic solvent, the amount of the organic solvent may be 30% by weight or more, 50% by weight or more, 75% by weight or more, or 90% by weight or more based on the liquid solvent. The amount of the organic solvent is 90% by weight or less, 50% by weight or less, 30% by weight or less, or 10% by weight or less based on the liquid medium.

The amount of the liquid medium may be 30% by weight or more, 50% by weight or more, 60% by weight or more, 75% by weight or more, or 90% by weight or more based on the composition. The amount of the liquid medium may be 95% by weight or less, 75% by weight or less, or 50% by weight or less based on the composition.

[Binder Resin]

The water-repellent composition may comprise a binder resin. The binder resin acts as a binder for binding the organic fine particles to the substrate. The binder resin is preferably a water-repellent resin. The water-repellent resin also acts as an active ingredient that exhibits water-repellency. Examples of the binder resin (C) include an acrylic polymer, a urethane polymer, a polyolefin, a polyester, a polyether, a polyamide, a polyimide, a polystyrene, and a silicone polymer. The amount of the binder resin may be 0.1 to 20 parts by weight, for example 0.1 to 10 parts by weight based on 100 parts by weight of the organic fine particle.

[Dispersant]

The water-repellent composition may comprise a dispersant in order to improve dispersibility of the organic fine particle. The dispersant may be a polymer dispersant, and is preferably a hydrophilic polymer dispersant. Polyvinyl pyrrolidone, polyvinyl alcohol, polyglycerol and polyacrylate may be used as the dispersant. The amount of the dispersant may be 0.1 to 20 parts by weight, for example 0.1 to 10 parts by weight based on 100 parts by weight of the organic fine particle. The dispersant may be removed from the water-repellent composition before water-repellent treatment.

[Surfactant]

The water-repellent composition may contain or may not contain a surfactant (emulsifier). In general, in order to stabilize the particles during polymerization and stabilize the aqueous dispersion after polymerization, a surfactant may be added in a small amount (for example, 0.01 to 15 parts by weight based on 100 parts by weight of the monomer) during or after the polymerization.

Especially when the object to be treated is a textile product, it is preferable that the surfactant contains a nonionic surfactant in the water-repellent composition. Furthermore, it is preferable that the surfactant comprises one or more surfactants selected from a cationic surfactant, an anionic surfactant and an amphoteric surfactant. It is preferable to use a nonionic surfactant and a cationic surfactant in combination.

For each of the nonionic surfactant, the cationic surfactant and the amphoteric surfactant, one of them may be used, or two or more of them may be used in combination.

The amount of the surfactant may be 15 parts by weight or less, 10 parts by weight or less, 7.5 parts by weight or less, 5 parts by weight or less, or 2.5 parts by weight or less based on 100 parts by weight of the organic fine particle. In general, when a surfactant is added, the stability of the aqueous dispersion and the permeability into fabric are improved, but the water-repellency is lowered. It is preferable to select the type and amount of the surfactant so as to achieve both of these effects. The organic fine particle of the present disclosure has excellent water-repellency and dispersibility (in particular, dispersibility in water), and thus the amount of the surfactant can be reduced.

[Other Additives]

The water-repellent composition may also comprise other additives. Examples of other additives include a binder resin, a water repellent agent, an oil repellent agent, a drying rate adjuster, a cross-linking agent, a film formation agent, a compatibilizer, an antifreezing agent, a viscosity adjuster, an ultraviolet absorber, an antioxidant, a pH adjuster, a antifoaming agent, a texture modifier, a slippage modifier, an antistatic agent, a hydrophilizing agent, an antibacterial agent, a preservative, an insect repellent, a fragrant agent and a flame retarder. The amount of other additives may be 0.1 to 20 parts by weight, and for example 0.1 to 10 parts by weight based on 100 parts by weight of the organic fine particle.

<Method for Producing Organic Fine Particle and Water-Repellent Composition>

A known method may be used as the method for preparing the core shell polymer constituting the organic fine particle, and seed polymerization is preferably used. The seed polymerization is a method in which core polymer particles prepared by polymerization of the first monomer are used as seed particles and the second monomer is polymerized in the vicinity of the surface of the seed particles to prepare a core-shell polymer.

The method for producing the polymers (the core polymer, the core-shell polymer) is not limited as long as a water-repellent composition in the form of an aqueous medium is obtained. For example, the polymer (organic fine particles) may be produced by polymerizing a monomer for organic fine particles in an aqueous medium in the presence or absence of a surfactant. Alternatively, an aqueous dispersion can be obtained by producing a polymer by solution polymerization, adding a surfactant and water, and removing the solvent.

When the water-repellent composition contains organic fine particles and a binder resin, the water-repellent composition containing organic fine particles and a binder resin can be produced by separately producing an aqueous dispersion of organic fine particles and an aqueous dispersion of a binder resin, and mixing the aqueous dispersion of organic fine particles and the aqueous dispersion of a binder resin. Alternatively, the water-repellent composition containing organic fine particles and a binder resin can be produced by polymerizing a monomer for the binder resin in an aqueous dispersion of the organic fine particles. Alternatively, the water-repellent composition containing organic fine particles and a binder resin can be produced by polymerizing a monomer for the organic fine particles in an aqueous dispersion of the binder resin.

In emulsion polymerization without using a surfactant, it is preferable to polymerize the monomer in an aqueous medium at a low concentration (for example, a monomer concentration of 1 to 30% by weight, particularly 1 to 15% by weight).

In the solution polymerization, a method is employed in which the monomer is dissolved in an organic solvent in the presence of a polymerization initiator, nitrogen substitution is performed, and then heating and stirring are performed in the range of 30 to 120° C. for 1 to 10 hours. Examples of the polymerization initiator include azobisisobutyronitrile, benzoyl peroxide, di-t-butyl peroxide, lauryl peroxide, cumene hydroperoxide, t-butyl peroxypivalate, and diisopropyl peroxydicarbonate. The polymerization initiator is used in the range of 0.01 to 20 parts by mole, for example, 0.01 to 10 parts by mole based on 100 parts by mole of the monomer.

The organic solvent is inert to the monomers and dissolves or homogeneously disperses them, and may be, for example, an ester (for example, an ester having 2 to 30 carbon atoms, specifically ethyl acetate, or butyl acetate), a ketone (for example, a ketone having 2 to 30 carbon atoms, specifically methyl ethyl ketone or diisobutyl ketone), or an alcohol (for example, an alcohol having 1 to 30 carbon atoms, specifically isopropyl alcohol, ethanol or methanol). Specific examples of organic solvents include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichloroethylene, perchloroethylene, tetrachlorodifluoroethane, and trichlorotrifluoroethane. The organic solvent is used in an amount of 50 to 99.5 parts by weight, for example, 70 to 99 parts by weight based on 100 parts by weight of the total of the monomer and the organic solvent.

In the emulsion polymerization, a method is employed in which the monomer is emulsified in water in the presence of a polymerization initiator and a surfactant, nitrogen substitution is performed, and then stirring and polymerization are performed in the range of 30 to 80° C. for 1 to 10 hours. Water-soluble polymerization initiators such as benzoyl peroxide, lauroyl peroxide, t-butyl perbenzoate, 1-hydroxycyclohexyl hydroperoxide, 3-carboxypropionyl peroxide, acetyl peroxide, azobisisobutylamidine-dihydrochloride, 2,2'-azobis(2-methylpropionamidine) dihydrochloride, 4,4'-azobis(4-cyanovaleric acid), 2,2'-azobis[2-methyl-N-(2-hydroxyethyl)propionamide], 2,2'-azobis[2-(2-imidazolin-2-yl)propane]dihydrochloride, 2,2'-azobis[2-(2-imidazolin-2-yl)propane], sodium peroxide, potassium persulfate, and ammonium persulfate, and oil-soluble polymerization initiators such as azobisisobutyronitrile, benzoyl peroxide, di-t-butyl peroxide, lauryl peroxide, cumene hydroperoxide, t-butyl peroxypivalate and diisopropyl peroxydicarbonate may be used as a polymerization initiator. The polymerization initiator is used in the range of 0.01 to 10 parts by mole based on 100 parts by mole of the monomer. If necessary, a reducing agent such as rongalite, ascorbic acid, tartaric acid, sodium disulfite, isoascorbic acid and ferrous sulfate may also be used in combination.

As the surfactant, various anionic, cationic or nonionic surfactants can be used, and the surfactant is used in the range of 0.5 to 20 parts by weight based on 100 parts by weight of the monomer. Anionic and/or nonionic and/or cationic surfactants are preferably used. When the monomers are not completely compatible with each other, it is also preferable to add a compatibilizer, for example, a water-soluble organic solvent, which is sufficiently compatible with these monomers. By adding the compatibilizer, it is possible to improve the emulsifiability and copolymerizability.

Examples of the water-soluble organic solvent include acetone, methyl ethyl ketone, ethyl acetate, propylene glycol, dipropylene glycol monomethyl ether, dipropylene glycol, tripropylene glycol, ethanol, and methanol, and the water-soluble organic solvent may be used in the range of 0.1 to 50 parts by weight, for example 1 to 40 parts by weight, based on 100 parts by weight of water.

A chain transfer agent may be used in the polymerization. The molecular weight of the polymer can be changed according to the amount of the chain transfer agent used. Examples of chain transfer agents are mercaptan group-containing compounds such as lauryl mercaptan, thioglycol, and thioglycerol (particularly alkyl mercaptan (having 1 to 30 carbon atoms, for example)), and inorganic salts such as sodium hypophosphite and sodium bisulfite. The amount of the chain transfer agent used may be in the range of 0.01 to 10 parts by weight, for example, 0.1 to 5 parts by weight, based on 100 parts by weight of the total amount of the monomers.

<Application of Water-Repellent Composition>

The water-repellent composition (and the aqueous dispersion of organic fine particles) can be used as an external treatment agent (surface-treatment agent) or an internal treatment agent. The water-repellent composition (and the aqueous dispersion of organic fine particles) can be used as an oil-repellent, a soil resistant agent, a soil release agent, a release agent, or a mold release agent.

By treating a substrate with the water-repellent composition, a surface coating structure in which the organic fine particles in the water-repellent composition are arranged on the surface of the substrate is formed. The surface coating structure has an uneven structure caused by the organic fine particles.

The fiber product treated therewith is dried, preferably heated at a temperature of Tg or more of the shell polymer, for example, 100 to 200° C. to develop water repellency. Treatment at the temperature of Tg or more of the shell polymer allows the shell polymer to move to the substrate. By contrast the hydrophobic core keeps its shape because it has high Tg. This provides a highly hydrophobic surface coating structure.

The surface coating structure may be formed by applying the water-repellent composition to a material to be treated (a substrate) by a known method. Usually, the water-repellent composition is diluted by dispersing it in an organic solvent or water, and is adhered to the surface of the object to be treated by a known method such as immersion coating, spray coating, or foam coating, and then dried. If necessary, the water-repellent composition may be applied together with a suitable cross-linking agent (for example, blocked isocyanate) for curing. Further, it is also possible to add an insect repellent, a softening agent, an antibacterial agent, a flame retarder, an antistatic agent, a coating material fixing agent, a wrinkle-resistant agent to the water-repellent composition and use in combination. The concentration of the polymer in the treatment liquid to be brought into contact with the substrate may be 0.01 to 10% by weight (particularly in the case of dip coating), for example, 0.05 to 10% by weight.

Examples of the object to be treated with the water-repellent composition (and the aqueous dispersion of organic fine particles) include textile products, stone materials, filters (for example, electrostatic filters), antidust masks, components of fuel cells (for example, gas diffusion electrodes and gas diffusion supports), glass, paper, wood, leather, fur, asbestos, bricks, cement, metals and oxides, ceramic products, plastics, coated surfaces and plasters. Various examples can be given as textile products. Examples of the textile products include various products such as animal and plant natural fibers such as cotton, hemp, wool and silk fibers, synthetic fibers such as polyamide, polyester, polyvinyl alcohol, polyacrylonitrile, polyvinyl chloride and polypropylene fibers, semisynthetic fibers such as rayon and acetate fibers, inorganic fibers such as glass fibers, carbon fibers and asbestos fibers, and mixtures of any of these fibers.

The water-repellent composition can also be used as an external mold release agent. For example, a surface of a substrate can be easily peeled from another surface (another surface on the substrate or a surface on another substrate).

The water-repellent compositions can be applied to fibrous substrates (for example, textile products) by any of the methods known for treating textile products with liquids. When the textile product is fabric, the fabric may be soaked in the solution, or the solution may be applied or sprayed to the fabric.

The water-repellent compositions may be applied to a textile product through a cleaning method, and may be, for example, applied to a textile product in washing application or a dry cleaning method.

The textile product to be treated is typically a fabric, and examples of the fabric include woven fabrics, knitted fabrics, nonwoven fabrics, clothing fabrics and carpets, or the textile product may also be a fiber, a yarn or an intermediate textile product (for example, a sliver or a rove). The textile product material may be a natural fiber (for example, cotton or wool fiber), a chemical fiber (for example, viscose rayon or lyocell), a synthetic fiber (for example, polyester, polyamide or acrylic fiber), or a mixture of fibers (for example, mixture of natural fibers and synthetic fibers).

Alternatively, the fibrous substrate may be leather. For making the leather hydrophobic and lipophobic, the organic fine particles may be applied to the leather in various stages of leather processing, for example in a leather wetting processing period or a leather finishing period.

Alternatively, the fibrous substrate may be paper. The organic fine particles may be applied to paper molded in advance, or applied in various stages of papermaking, for example in a paper drying period.

The "treatment" means that by immersion, spraying, coating or the like, the treatment agent is applied to the object to be treated. The treatment causes the organic fine particles as an active ingredient of the treatment agent to permeate the inside of the object to be treated and/or adhere to a surface of the object to be treated.

In the treated substrate (particularly textile products), the falling speed of water is preferably 130 mm/sec or more, and for example, preferably 150 mm/sec or more or 200 mm/sec or more.

The treated substrate exhibits the effect of preventing frost formation.

While certain embodiments have been described, it will be understood that various changes in form and details may be made therein without departing from the spirit and scope of the claims.

EXAMPLES

Hereinafter, the present disclosure will be described in detail with reference to Examples, but the present disclosure is not limited to these Examples. In the following, parts or % or ratios represent parts by weight or % by weight or weight ratios unless otherwise specified.

<Test Method>

(Method of Measuring Tg and Melting Point)

The melting point of the polymer was calculated by differential scanning calorimetry (DSC). In the DSC measurement, under a nitrogen atmosphere, the copolymer was cooled to −20° C., then the temperature was raised at 10° C./minute to 200° C., and the polymer was cooled again to −20° C., and thereafter, the melting point observed in the temperature rising process at 10° C./minute to 200° C. was measured. In a polymer in which a plurality of melting peaks appear, the peak having the largest quantity of heat of melting, which was derived from melting of long-chain alkyl, was taken as the melting point. The glass transition point (glass transition temperature) was determined by obtaining a DSC curve by determining the temperature indicated by the midpoint of the intersection between the extension of the baseline before and after the second order transition of the DSC curve and the tangent at the inflection point of the DSC curve.

(Method of Measuring Water Contact Angle of Polymer)

For the water contact angle of the polymer, a silicon wafer substrate was spin-coated with a chloroform solution of the resulting polymer with a solid concentration of 1.0% and the static water contact angle was measured. The static contact angle was obtained by dropping 2 μL of water on a coating film and measuring the contact angle 1 minute after the droplet reached the film.

(Method of Measuring Solubility in Water)

For the solubility in water of the polymer, water (25° C.) and a sample were mixed in the same weight using a stirrer under conditions of a rotational number of 300 rpm and 30 minutes, and then the aqueous phase was collected and dried at 100° C. for 1 hour, and the amount of the polymer in the aqueous phase was determined from loss on drying to calculate the solubility in water of the polymer. For the solubility in water of the monomers, the respective monomers were added in small batches to a predetermined amount of water, and the solubility in water was determined from the amount of dissolution when no more monomer could be dissolved (floating, precipitation or deposition occurred, or the solution became clouded).

Properties of stearyl acrylate (SA) and 2-ethyhexyl methacrylate (EHMA) used in Examples are as follows.

TABLE 1

| | Tg of homo-polymer (° C.) | Melting point of homo-polymer (° C.) | Water contact angle of homopolymer (°) | Solubility in water of homopolymer (g/L) | Solubility in water of monomer (g/L) |
|---|---|---|---|---|---|
| SA | 30 | 50 | 102 | <0.1 | <0.1 |
| EHMA | −15 | None | 97 | <0.1 | <0.1 |

Example 1 PSA/PEHMA Core-Shell Particle

[Preparation of PSA Particle]

A predetermined amount of SA (Tg of homopolymer: 30° C.), 2,2'-azobisisobutyronitrile (AIBN), polyvinylpyrrolidone (PVP) (K-30, molecular weight: 40,000) and ethanol were placed in a sealed tube under conditions shown in Table 2 and dispersion polymerization was performed in nitrogen atmosphere at 60° C. at 80 cycles/minute for 24 hours. The poly(stearyl acrylate) (PSA) particles obtained were centrifuged after polymerization using a methanol medium to remove excess PVP.

TABLE 2

| Raw material | Amount used |
|---|---|
| SA | 0.32 g |
| AIBN | 0.01 g |
| PVP | 0.2 g |
| Ethanol | 6 g |

Figure 1B:
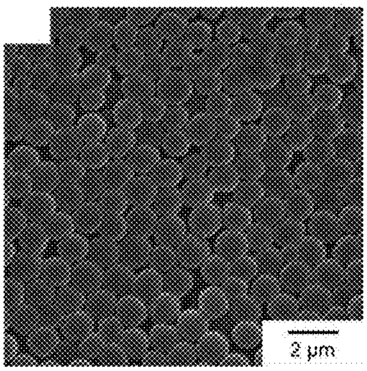

Optical micrographs and scanning electron micrographs (SEM) of the resulting particles are shown. The analysis results using an image analysis software (Win roof made by Mitani Corporation) confirm that relatively monodisperse PSA particles with a number average particle size of 1.27 μm and a fluctuation coefficient (Cv value) of 6.4% were prepared (FIGS. 1A and 1B).

[Preparation of PSA/PEHMA Core-Shell Particle]

Core-shell particles were prepared by seed dispersion polymerization using EHMA of which homopolymer has a lower Tg than SA (of which homopolymer has a Tg of −10° C.). A predetermined amount of the PSA particles obtained above, which were the seed, EHMA, AIBN, PVP (K-30), methanol and water were placed in a sealed tube under conditions shown in Table 3, and polymerization was performed in nitrogen atmosphere at 60° C. using a shaker at 120 cycles/minute for 24 hours. The poly(stearyl acrylate)/poly(2-ethylhexyl methacrylate) (PSA/PEHMA) particles obtained were centrifuged after polymerization using a methanol medium to remove excess PVP.

TABLE 3

| Raw material | Amount used |
|---|---|
| PSA particle | 0.4 g |
| EHMA | 0.2 g |
| AIBN | 0.003 g |
| PVP | 0.02 g |
| Methanol | 6.4 g |
| Water | 1.6 g |

Figure 2A:
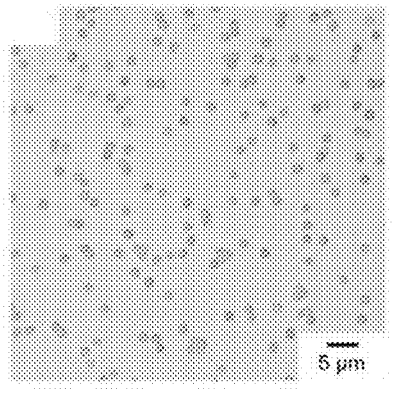
FIG. 2A is an optical micrograph of PSA particles before seed polymerization and FIG. 2B is an optical micrograph of PSA/PEHMA particles after seed polymerization in Examples.
Figure 2B:
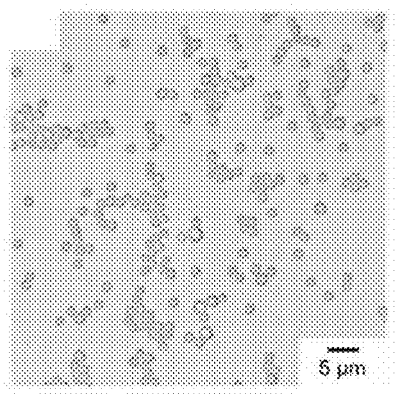

FIGS. 2A and 2B are optical micrographs of the particles before and after the seed dispersion polymerization. FIG. 2A is a micrograph of emulsion of the PSA particle before the seed dispersion polymerization; and FIG. 2B is a micrograph of emulsion of the PSA/PEHMA particles after the seed dispersion polymerization. An increase in the particle size before and after the polymerization suggests the progress of the polymerization.

Figure 3A:
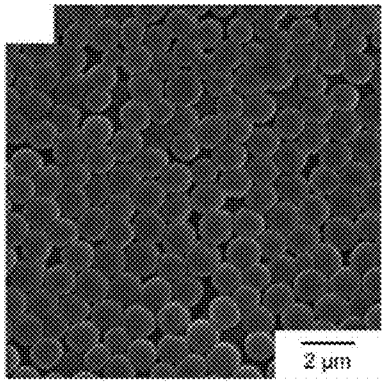
FIG. 3A is a SEM image of cast PSA particles and FIG. 3B is a SEM image of cast PSA/PEHMA particles in Examples.
Figure 3B:
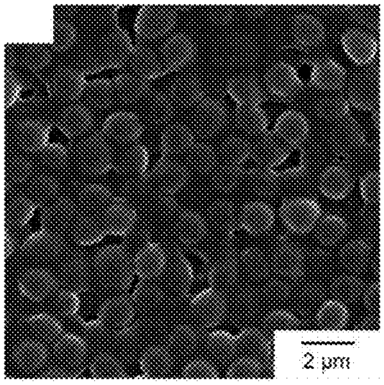

FIG. 3A is a SEM image of PSA particles cast at room temperature and FIG. 3B is a SEM image of PSA/PEHMA particles cast at room temperature. In the PSA/PEHMA particles, PSA, the core, has a Tg of 30° C., and PEHMA, the shell, has a $T_g$ of −10° C. Thus, only PEHMA, which was the shell, was observed to be fused at room temperature, suggesting that a core-shell particle was formed.

[Preparation of Emulsion Film of PSA/PEHMA Particle]

An emulsion of the resulting PSA/PEHMA particles (an ethanol medium) was dropped on a glass slide and dried under conditions of room temperature (about 20° C.) and 24 hours to prepare an emulsion film of the PSA/PEHMA particles having a core-shell structure.

The surface of the emulsion film of the PSA/PEHMA particles was observed using the optical micrograph, and as a result the film was found to be highly uniform without cracks on the surface.

[Measurement of Water Contact Angle of Emulsion Film of PSA/PEHMA Particle]

The water contact angle of the resulting film was measured using a contact angle meter (Dropmaster 6000X made by Kyowa Interface Science Co., Ltd.). The result is that the emulsion film of the PSA/PEHMA particles keeps high water-repellency with a water contact angle of 126.3°.

Comparative Example 1: Preparation of Emulsion Film of PSA Particle and PSA Smooth Film

[Preparation of Emulsion Film of PSA Particle and PSA Smooth Film]

The emulsion of the PSA particles (an ethanol medium) prepared in Example 1 was dropped on a glass slide and dried under conditions of room temperature (about 20° C.) and 24 hours to prepare an emulsion film of the PSA particles.

A PSA smooth film for comparison was prepared by dropping an emulsion of particles (an ethanol medium) prepared in the same manner on an aluminum substrate and dried under conditions of room temperature and 24 hours to prepare an emulsion film of the PSA particles, and then melt-pressing the film under conditions of 80° C., 10 MPa and 10 minutes.

The surface of the PSA smooth film and the surface of the emulsion film of the PSA particles were observed by an SEM. The particle shape of PSA was not maintained on the surface of the PSA smooth film, and this suggests that the film has a smooth surface. Many cracks were observed on the surface of the emulsion film of the PSA particles, and this means that the film is not sufficiently uniform. Many cracks were visually observed on the surface of the emulsion film of the PSA particles.

[Measurement of Water Contact Angle of Emulsion Film of PSA Smooth Film and Emulsion Film of PSA Particle]

The water contact angle of the resulting films was measured using a contact angle meter (Dropmaster 6000X made by Kyowa Interface Science Co., Ltd.). The result is that the PSA smooth film has a water contact angle of 102.1° and the emulsion film of the PSA particles has a water contact angle of 118.5°.

[Measurement of Water Contact Angle of PSA Particle after Re-Dispersion in Water]

The emulsion of the PSA particles was an ethanol solution, and thus powder was collected by centrifugation, and then the resultant was attempted to be dispersed in water. However, re-dispersion into water failed due to high water-repellency. Then, sodium lauryl sulfate was added to the polymer as a surfactant at 5% based on the polymer and the polymer was redispersed to give an aqueous emulsion. The water contact angle of a film formed using the emulsion was measured to be 100°, suggesting that the surfactant reduced water repellency.

An embodiment of the present disclosure is as follows.

[Item 1]

An organic fine particle comprising a core polymer and a shell polymer, wherein

- the core polymer has a Tg or a melting point of 15° C. or more,
- the core polymer has a water contact angle of 1000 or more,
- all monofunctional monomers constituting the core polymer are a hydrophobic core monomer of which homopolymer has a water contact angle of 1000 or more,
- the shell polymer has a Tg or a melting point lower than the Tg of the core polymer, or the shell polymer has a Tg or a melting point lower than the melting point of the core polymer,
- the shell polymer has a water contact angle of less than 100°, and
- all monofunctional monomers constituting the shell polymer are a water-insoluble shell monomer of which homopolymer is water-insoluble.

[Item 2]

The organic fine particle according to Item 1, wherein

- the core polymer comprises a repeating unit derived from a crosslinkable core monomer having at least two ethylenically unsaturated double bonds, and
- the shell polymer is free of a repeating unit derived from a crosslinkable shell monomer having at least two ethylenically unsaturated double bonds.

[Item 3]

The organic fine particle according to Item 1 or 2, wherein

- the core polymer comprises a repeating unit derived from a crosslinkable core monomer having at least two ethylenically unsaturated double bonds, and
- the shell polymer has a Tg or a melting point lower than the 10% thermal decomposition temperature of the core polymer.

[Item 4]

The organic fine particle according to any one of 1 to 3, wherein the hydrophobic core monomer is free of a reactive/hydrophilic monomer having an ethylenically unsaturated double bond and at least one reactive group and/or hydrophilic group.

[Item 5]

The organic fine particle according to Item 4, wherein the reactive/hydrophilic monomer is at least one monomer selected from the group consisting of glycidyl (meth)acrylate, glycerol (meth)acrylate, hydroxymethyl (meth)acrylate, hydroxyethyl (meth)acrylate, 3-hydroxypropyl (meth) acrylate, 2-hydroxypropyl (meth)acrylate, 2,3-dihydroxypropyl (meth)acrylate, 3-chloro-2-hydroxypropyl (meth)acrylate, 3-hydroxybutyl (meth)acrylate, 4-hydroxybutyl (meth)acrylate, 2-hydroxybutyl (meth)acrylate, 2-acetoacetoxyethyl (meth)acrylate, 4-hydroxybutyl acrylate glycidyl ether, acrylic acid, methacrylic acid, trimethylsilyl (meth)acrylate, 2-(trimethylsilyloxy)ethyl (meth)acrylate, 2-(dimethylamino)ethyl (meth)acrylate, 2-(tert-butylamino) ethyl (meth)acrylate, a dimethylaminoethyl methacrylate quaternary compound and tetrahydrofurfuryl (meth)acrylate.

[Item 6]

The organic fine particle according to any one of Items 1 to 5, wherein the homopolymer of the water-insoluble shell monomer has a solubility in water at 25° C. of 10 g/l or less.

[Item 7]

The organic fine particle according to any one of Items 1 to 6, wherein the hydrophobic core monomer has at least one hydrocarbon group having 4 to 40 carbon atoms or fluoroalkyl group having 2 to 6 carbon atoms.

[Item 8]

The organic fine particle according to any one of Items 1 to 7, wherein the hydrophobic core monomer is represented by the formula:

$$CH_2{=}C(—R^{12})—C({=}O)—Y^{11}—(R^{11})_k \text{ or}$$

$$CH_2{=}C(—R^{22})—Y^{21}—(H)_{5-l}—(R^{21})_l$$

- wherein $R^{11}$ is an aliphatic hydrocarbon group having 11 to 40 carbon atoms or $—(CH_2)_jR^{13}$, where $R^{13}$ is a fluoroalkyl group having 2 to 6 carbon atoms and j is 1 to 6,
- $R^{21}$ is a hydrocarbon group having 3 to 30 carbon atoms,
- $R^{12}$ and $R^{22}$ are each independently a hydrogen atom, a monovalent organic group or a halogen atom,
- $Y^{11}$ is a divalent to tetravalent group composed of at least one selected from a direct bond, a divalent to tetravalent hydrocarbon group having 1 carbon atom, $—C_6H_4—$, $—O—$, $—C({=}O)—$, $—S({=}O)_2—$ and $—NR'—$, where R' is H or a hydrocarbon group having 1 to 4 carbon atoms,
- $Y^{21}$ is a group formed by removing l+1 hydrogen atoms from a benzene ring,
- H is a hydrogen atom,
- H and $R^{21}$ are each directly bonded to $Y^{21}$, and
- k and l are each independently 1 to 3.

[Item 9]

The organic fine particle according to any one of Items 1 to 8, wherein the water-insoluble shell monomer has at least one hydrocarbon group having 1 to 10 carbon atoms or fluoroalkyl group having 1 carbon atom.

[Item 10]

The organic fine particle according to any one of Items 1 to 9, wherein the water-insoluble shell monomer is represented by the formula:

$$CH_2{=}C(—R^{32})—C({=}O)—Y^{31}—(R^{31})_m \text{ or}$$

$$CH_2{=}C(—R^{42})—Y^{41}—(H)_{5-n}—(R^{41})_n$$

wherein $R^{31}$ is an aliphatic hydrocarbon group having 1 to 10 carbon atoms or $—(CH_2)_iR^{33}$, where $R^{33}$ is a fluoroalkyl group having 1 carbon atom and i is 1 to 6, $R^{41}$ is a hydrocarbon group having 1 to 2 carbon atoms, $R^{32}$ and $R^{42}$ are each independently a hydrogen atom, a monovalent organic group or a halogen atom, $Y^{31}$ is a divalent to tetravalent group composed of at least one selected from a direct bond, a divalent to tetravalent hydrocarbon group having 1 carbon atom, $—C_6H_4—$, —O—, —C(═O)—, $—S(═O)_2—$ and —NR'—, where R' is H or a hydrocarbon group having 1 to 4 carbon atoms, $Y^{41}$ is a group formed by removing n+1 hydrogen atoms from a benzene ring, H is a hydrogen atom, H and $R^{41}$ are each directly bonded to $Y^{41}$, and m is 1 to 3 and n is 0 to 3.

[Item 11]

The organic fine particle according to any one of Items 1 to 10, wherein the repeating unit derived from the hydrophobic core monomer is 70 parts by mole or more based on 100 parts by mole in total of the repeating units in the core polymer, and the repeating unit derived from the water-insoluble shell monomer is 70 parts by mole or more based on 100 parts by mole in total of the repeating units in the shell polymer.

[Item 12]

The organic fine particle according to any one of Items 1 to 11, having an average particle size of 10 nm to 5,000 nm.

[Item 13]

A surface coating structure, comprising the organic fine particle according to any one of Items 1 to 12 arranged on a surface of a substrate.

[Item 14]

A water-repellent composition which is a dispersion of an organic fine particle, the composition comprising:

the organic fine particle according to any of Items 1 to 12; and a liquid medium.

[Item 15]

A method for forming a surface coating structure, comprising applying a treatment liquid comprising the water-repellent composition according to Item 14 to a substrate.

What is claimed is:

1. An organic particle comprising a core polymer and a shell polymer, wherein the core polymer has a Tg or a melting point of 15° C. or more, the core polymer has a water contact angle of 100° or more, all monofunctional monomers constituting the core polymer are a hydrophobic core monomer of which homopolymer has a water contact angle of 100° or more, the shell polymer has a Tg or a melting point lower than Tg or the melting point of the core polymer, the shell polymer has a water contact angle of less than 100°, all monofunctional monomers constituting the shell polymer are a water-insoluble shell monomer of which homopolymer is water-insoluble the core polymer is a non-fluorine polymer, the water-insoluble shell monomer has at least one hydrocarbon group having 1 to 10 carbon atoms or fluoroalkyl group having 1 carbon atom, and the organic particle has an average particle size of 10 nm to 5,000 nm.

2. The organic particle according to claim 1, wherein the core polymer comprises a repeating unit derived from a crosslinkable core monomer having at least two ethylenically unsaturated double bonds, and the shell polymer is free of a repeating unit derived from a crosslinkable shell monomer having at least two ethylenically unsaturated double bonds.

3. The organic particle according to claim 1, wherein the core polymer comprises a repeating unit derived from a crosslinkable core monomer having at least two ethylenically unsaturated double bonds, and the shell polymer has a Tg or a melting point lower than the 10% thermal decomposition temperature of the core polymer.

4. The organic particle according to claim 1, wherein the hydrophobic core monomer is free of a reactive/hydrophilic monomer having an ethylenically unsaturated double bond and at least one reactive group and/or hydrophilic group.

5. The organic particle according to claim 1, wherein the hydrophobic core monomer is free of glycidyl (meth)acrylate, glycerol (meth)acrylate, hydroxymethyl (meth)acrylate, hydroxyethyl (meth)acrylate, 3-hydroxypropyl (meth)acrylate, 2-hydroxypropyl (meth)acrylate, 2,3-dihydroxypropyl (meth)acrylate, 3-chloro-2-hydroxypropyl (meth)acrylate, 3-hydroxybutyl (meth)acrylate, 4-hydroxybutyl (meth)acrylate, 2-hydroxybutyl (meth)acrylate, 2-acetoacetoxyethyl (meth)acrylate, 4-hydroxybutyl acrylate glycidyl ether, acrylic acid, methacrylic acid, trimethylsilyl (meth)acrylate, 2-(trimethylsilyloxy)ethyl (meth)acrylate, 2-(dimethylamino)ethyl (meth)acrylate, 2-(tert-butylamino)ethyl (meth)acrylate, a dimethylaminoethyl methacrylate quaternary compound and tetrahydrofurfuryl (meth)acrylate.

6. The organic particle according to claim 1, wherein the homopolymer of the water-insoluble shell monomer has a solubility in water at 25° C. of 10 g/l or less.

7. The organic particle according to claim 1, wherein the hydrophobic core monomer has at least one hydrocarbon group having 4 to 40 carbon atoms.

8. The organic particle according to claim 1, wherein the hydrophobic core monomer is represented by the formula:

$$CH_2═C(—R^{12})—C(═O)—Y^{11}—(R^{11})_k \text{ or}$$

$$CH_2═C(—R^{22})—Y^{21}—(H)_{5-l}—(R^{21})_l$$

wherein $R^{11}$ is an aliphatic hydrocarbon group having 11 to 40 carbon atoms, $R^{21}$ is a hydrocarbon group having 3 to 30 carbon atoms, $R^{12}$ and $R^{22}$ are each independently a hydrogen atom, a monovalent organic group or a halogen atom other than fluorine, $Y^{11}$ is a divalent to tetravalent group composed of at least one selected from a direct bond, a divalent to tetravalent hydrocarbon group having 1 carbon atom, $—C_6H_4—$, —O—, —C(═O)—, $—S(═O)_2—$ and —NR'—, where R' is H or a hydrocarbon group having 1 to 4 carbon atoms, $Y^{21}$ is a group formed by removing l+1 hydrogen atoms from a benzene ring, H is a hydrogen atom, H and $R^{21}$ are each directly bonded to $Y^{21}$, and k and l are each independently 1 to 3.

9. The organic particle according to claim 1, wherein the water-insoluble shell monomer is represented by the formula:

$CH_2{=}C(—R^{32})—C({=}O)—Y^{31}—(R^{31})_m$ or $CH_2{=}C(—R^{42})—Y^{41}—(H)_{5-n}—(R^{41})_n$ wherein $R^{31}$ is an aliphatic hydrocarbon group having 1 to 10 carbon atoms or $—(CH_2)_iR^{33}$, where $R^{33}$ is a fluoroalkyl group having 1 carbon atom and i is 1 to 6, $R^{41}$ is a hydrocarbon group having 1 to 2 carbon atoms, $R^{32}$ and $R^{42}$ are each independently a hydrogen atom, a monovalent organic group or a halogen atom, $Y^{31}$ is a divalent to tetravalent group composed of at least one selected from a direct bond, a divalent to tetravalent hydrocarbon group having 1 carbon atom, $—C_6H_4—$, —O—, —C(=O)—, $—S(=O)_2—$ and —NR'—, where R' is H or a hydrocarbon group having 1 to 4 carbon atoms, $Y^{41}$ is a group formed by removing n+1 hydrogen atoms from a benzene ring, H is a hydrogen atom, H and $R^{41}$ are each directly bonded to $Y^{41}$, and m is 1 to 3 and n is 0 to 3.

10. The organic particle according to claim 1, wherein the repeating unit derived from the hydrophobic core monomer is 70 parts by mole or more based on 100 parts by mole in total of the repeating units in the core polymer, and the repeating unit derived from the water-insoluble shell monomer is 70 parts by mole or more based on 100 parts by mole in total of the repeating units in the shell polymer.

11. A surface coating structure, comprising the organic particle according to claim 1 arranged on a surface of a substrate.

12. A water-repellent composition which is a dispersion of an organic particle, the composition comprising:

the organic fine particle according to claim 1; and a liquid medium.

13. A method for forming a surface coating structure, comprising applying a treatment liquid comprising the water-repellent composition according to claim 12 to a substrate.

* * * * *